US00RE33798E

United States Patent [19]

Waltonen

[11] E Patent Number: Re. 33,798

[45] Reissued Date of Patent: Jan. 21, 1992

[54] SELF-EQUALIZING PIERCING MACHINE

[75] Inventor: Edward J. Waltonen, Southfield, Mich.

[73] Assignee: REO Hydraulic Pierce & Form Inc., Detroit, Mich.

[21] Appl. No.: 579,980

[22] Filed: Sep. 6, 1990

Related U.S. Patent Documents

Reissue of:

[64] Patent No.: 4,716,803
Issued: Jan. 5, 1988
Appl. No.: 427,048
Filed: Sep. 29, 1982

[51] Int. Cl.[5] ..... B26D 5/12; B26D 7/26

[52] U.S. Cl. ..... 83/529; 83/615; 83/621; 83/635; 83/639.1; 83/687

[58] Field of Search ..... 83/639.1, 698, 684, 83/685, 615, 529, 623, 617, 635, 618, 620, 621, 530, 687; 219/86.61, 89; 72/465

[56] References Cited

U.S. PATENT DOCUMENTS

| | | | |
|---|---|---|---|
| 1,452,224 | 4/1923 | Smith | 83/615 |
| 3,759,130 | 9/1973 | Patterson | 83/698 |
| 4,073,176 | 2/1978 | Paul | 83/623 |
| 4,098,161 | 7/1978 | Bloch | 83/615 |

*Primary Examiner*—Hien H. Phan
*Attorney, Agent, or Firm*—Krass & Young

[57] ABSTRACT

A self-equalizing device for performing mechanical operations such as piercing and punching wherein the piston means forming the work ram is internally mounted within the proximal portion of a yoke body, the yoke body being in turn mounted for sliding or rolling displacement on a stationary base. A knock out slot for a pin type punch is provided in the external portion of the piston ram. Single and multiple action devices are disclosed.

6 Claims, 3 Drawing Sheets

4
4
20
80
18
22
26
16
24
78
12

80
16
36
22
78
24
66
54
10
12
6
6
52
56
35
56a
5
5
60
38
58
28
26
62
10a
64

SELF-EQUALIZING PIERCING MACHINE

Matter enclosed in heavy brackets [ ] appears in the original patent but forms no part of this reissue specification; matter printed in italics indicates the additions made by reissue.

TECHNICAL FIELD

This invention relates to devices for performing mechanical operations such piercing, punching and forming on a workpiece and more particularly to an improved device for applying mechanical forces to the workpiece in a self-equalized fashion.

BACKGROUND OF THE INVENTION

Mechanical operations such as piercing, punching, shape forming and resistance welding are common to many industrial fabrication processes. In many instances, it is desirable or necessary to perform such operations on a relatively thin section workpiece which is already finished to proper size and material specification; for example, it may be necessary to pierce or punch a hole or group of holes in a metal bracket which is stamped, finished and heat treated prior to the piercing or punching operation. Under these circumstances, it is desirable to avoid any significant deformation or reshaping of the workpiece during the piercing or punching operation. This can be achieved through the use of a so-called "self-equalizing" fabrication device or machine; i.e., a device or machine which engages and applies equal forces to the opposite sides of the workpiece during the mechanical operation so that undesirable inelastic deformation is avoided.

Prior art devices which are capable of accomplishing mechanical operations is self-equalized fashion are disclose in U.S. Pat. No. 3,008,032 to Wolfbauer, Jr. and U.S. Pat. No. 3,396,260 to Waltonen. In both of these patents, the mechanical operation is resistance welding and the term "mechanical operation" is used herein to encompass not only resistance welding but piercing, punching, pressing, rivoting, stamping and shaping operations.

In both the Wolfbauer and Waltonen patents the apparatus comprises a base which may be bolted or otherwise secured to a support surface, a yoke member which is bidirectionally displaceable relative to the base along a work axis and which comprises or supports an element which engages and supports one side of a workpiece during a mechanical operation. The Wolfbauer and Waltonen devices further comprise an hydraulically operated piston which is displaceable along the work axis relative to the yoke and which comprises or supports a second element which contacts the other side of the workpiece during the work stroke. Due to the arrangement of the yoke and piston, the application of hydraulic pressure to the piston causes the piston carried work element to advance toward the front side of the workpiece as the yoke advances toward the back of the workpiece to effectively clamp the workpiece in a self-equalized fashion which avoids or prevents the deformation which might result from applying mechanical forces to only one side of the workpiece.

In both of the prior art patents mentioned above, the piston and cylinder arrangement are substantially wholly external to the yoke thus giving rise to the necessity for numerous components and mechanical connections which accommodate the relative displacement or travel of the various parts. In addition, the devices tend to be relatively complex and difficult to mount in varying orientations.

BRIEF SUMMARY OF THE INVENTION

The primary object of the present invention is to improve upon and simplify the prior art self-equalized pressure applying devices through the integration of the yoke and piston assemblies whereby the piston is essentially internalized within the yoke body so as to result in a simplified and more compact device capable of operation and mounting in various orientations and environments. In general, this accomplished by providing a yoke having a proximal portion mounted on a base for bidirectional movement along a work axis and a distal portion for supporting one side of a workpiece during a mechanical operation. Piston means are slideably mounted internally within the proximal portion of the yoke for bidirectional movement relative to the yoke.

Various features and advantages arise out of the internalization of the piston within the proximal portion of the yoke. For example, the integrated piston-yoke arrangement permits the use of an internal element or core through which fluid passages and ports may be defined so as to minimize the travel of hydraulic lines which are connected to the device.

In the preferred embodiment, the self-equalizing device comprises adjustable mechanical stop means for limiting the travel of the piston relative to the yoke during the return stroke thus to limit the amount by which the yoke separates from the workpiece at the end of the return stroke. In addition, linear bearings are provided between the yoke and the base to reduce friction and increase operating efficiency while at the same time remaining entirely compatible with the highly simplified mechanical structure. In addition, compression spring means are provided between the yoke and base and operable in either of two modes to either store energy at the end of the return stroke so as to automatically bring the yoke up to the workpiece at the beginning the next work stroke or at the end of the work stroke so as to automatically open the yoke and separate it from the workpiece at the beginning of the return stroke; the particular function of the spring means being selected in accordance with the orientation of the device either horizontal or vertical. The preferred device further comprises a novel slot which permits access with a tool such as screwdriver to the interior or backside of a punch or piercing die to facilitate removal of a worn punch or die for replacement or repair purposes.

Other features and advantages including the disclosure of a simple bolt together structure will be apparent from a reading of the following complete specification which describes illustrative embodiments of the device in detail. The first embodiment is a single action device wherein piercing occurs only during the work stroke and the second embodiment is a double action device wherein piercing occurs on both work and return strokes.

DETAILED DESCRIPTION OF THE ILLUSTRATIVE EMBODIMENT

Figure 1:
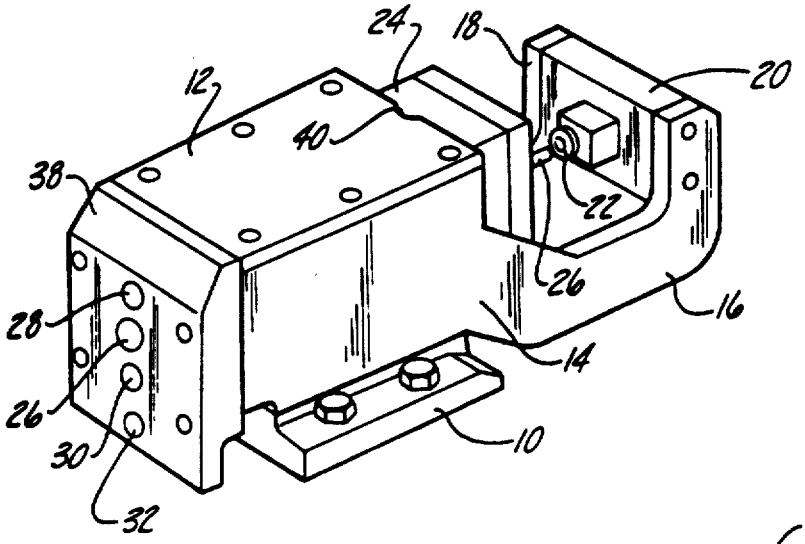
FIG. 1 is a perspective view of a piercing apparatus embodying the invention.

Referring to FIG. 1, a device embodying the invention as shown to comprise a base 10 which may be bolted to a support surface and which carries thereon a yoke 12 which is adapted for bidirectional displacement relative to the base 10 along a longitudinal work axis. Yoke 12 comprises a proximal portion 14 having a hollow body mounted directly over the base 10 and a distal portion made up of spaced parallel arms 16 and 18 between which is mounted a die retainer plate 20. Plate 20 carries a punch die button 22 which engages and provides back up support forces on the workpiece in a course of a punching or piercing operation.

The apparatus of FIG. 1 further comprises a piston means 24 which is displaceably mounted within the hollow proximal portion 14 of the yoke 12 to advance and retract a punch 26 which cooperates with the button 22 to pierce or form a hole in a workpiece which is disposed within a gap between the piston means 24 and the distal portion of the yoke as defined by elements 16, 18 and 20. Relative displacement during work and return strokes is produced by hydraulic fluid pressure, port 26 being provided in the proximal portion 14 of the yoke for the application of fluid pressure during the work stroke and port 28 being provided for application of fluid pressure during the return stroke. Holes 30 and 32 are provided in the end cap 38 of the yoke 12 for access to an adjustable stop and an energy storing spring as hereinafter described with reference to FIGS. 3 through 5.

Figure 2:
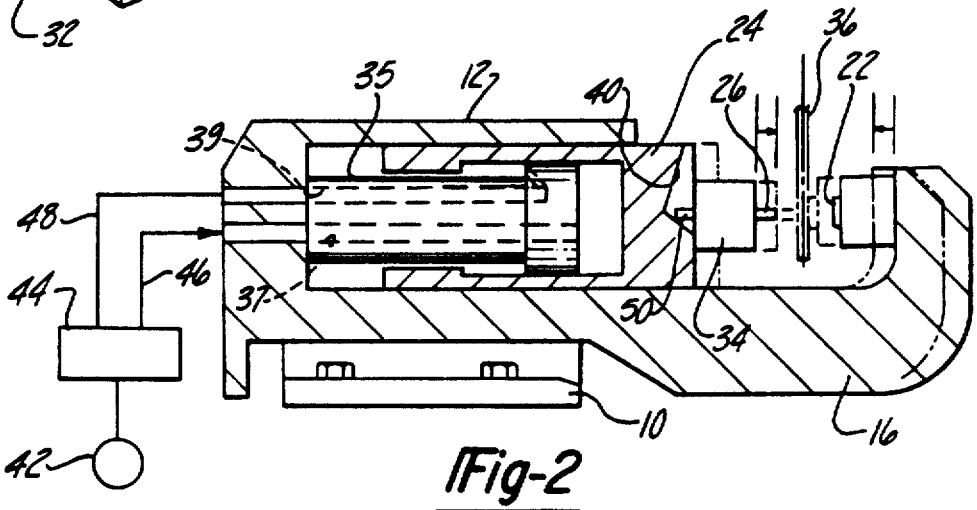
FIG. 2 is a highly simplified sectional view of the device of FIG. 1 illustrating the operating principle thereof.

Referring now to FIG. 2, it can be seen that the hollow proximal portion 14 of the yoke 12 accommodates therein a hollow sliding piston 24 the external end of which carries the conventional punch retainer 34 and in the piercing art is typically referred to as the "ram". Mounted within the piston or ram 24 and fixed relative to the yoke 12 is a piston core 35 having internal bores 37 and 39 which are in fluid communication with the ports 26 and 28 respectively to admit fluid under pressure to opposite working surfaces of the piston 24 to cause work and return strokes thereof. Fluid under pressure is provided by means of a pump 42 to a conventional spool valve 44 having output lines 46 and 48 connected to work stroke and return stroke ports 26 and 28 respectively. It can be seen that as fluid pressure is applied to line 46 through spool valve 44, such pressure tends to drive the piston 24 to the right relative to the yoke 12 as seen in FIG. 2. This causes the punch retainer 34 and the punch 26 to advance toward the workpiece 36. Because the yoke 12 is displaceably mounted on the base 10, such fluid pressure also causes the yoke 12 to move to the left as seen in FIG. 2 thus advancing the die button 22 toward the workpiece 36 to back up the workpiece during the punching operation. The result is a punching operation which is free from unequalized or unilateral forces which might bend or distort the workpiece 36 to the point where it might no longer be suitable for its intended purpose.

It can further be seen that the application of fluid pressure to line 48 and the relief of pressure in line 46 causes the piston 24 to move to the left and the yoke 12 to move the right thus opening the punch assembly 22, 26, 34 to permit the workpiece 36, now finished, to be removed. Although not shown in FIG. 2 a conventional stripper may be employed in the punch to assist in the removal function.

Evident in FIGS. 1 and 2 is a slot 40 which is formed in the external portion of the ram means 24 to permit a tool such as a screwdriver or rod to be inserted for the purpose of engaging a pin 50 which extends through the punch retainer 34 to permit the punch 26 to be knocked out for repair or replacement purposes.

Figure 5:
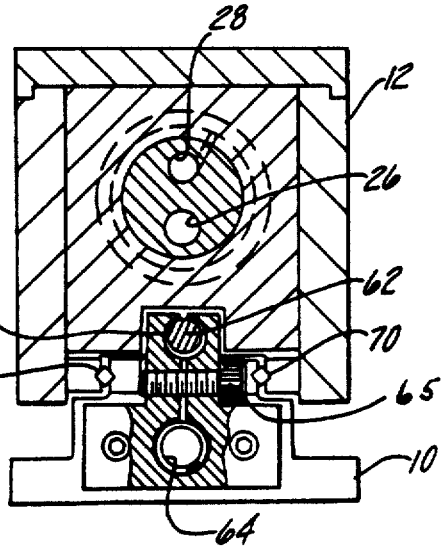
FIG. 5 is a further sectional view through section line 5—5 of FIG. 4.
Figure 3:
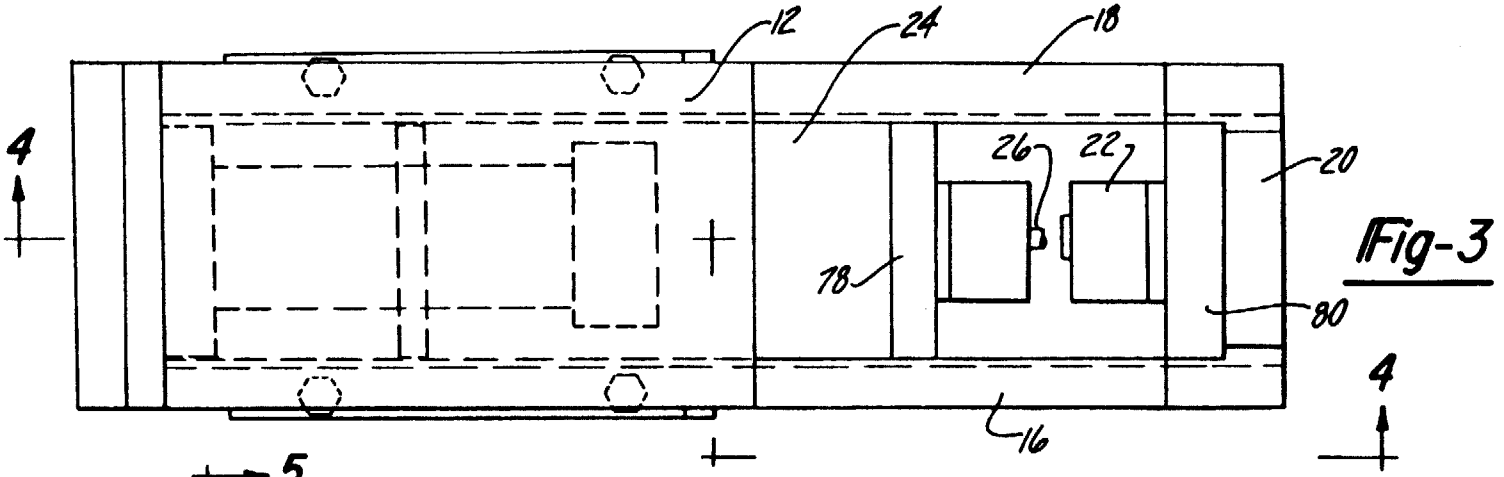
FIG. 3 is a plan view of the device of FIG. 1.
Figure 4:
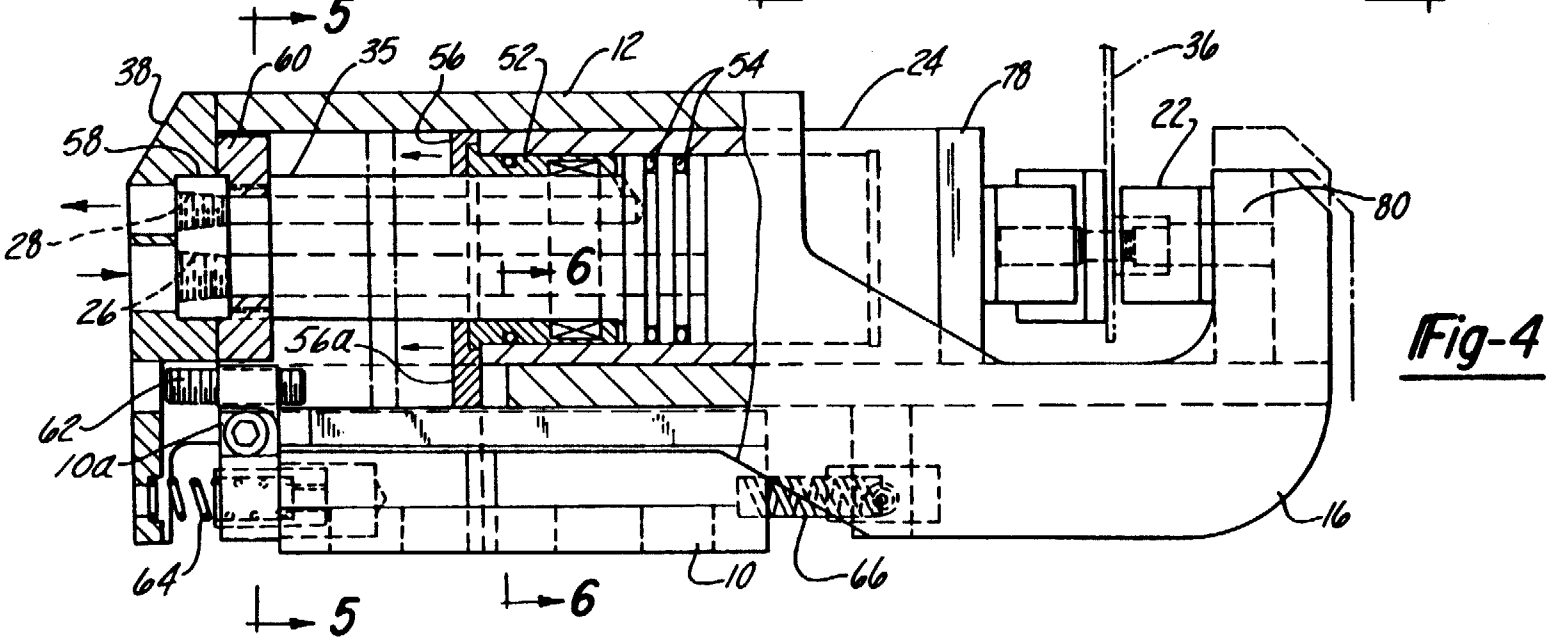
FIG. 4 is a detailed sectional view of the device of FIG. 1 along a second line 4—4 of FIG. 3.

Referring now to FIGS. 3 through 5, the details of the piston means 24 are shown to include seals 52 and 54 which permits the piston ram to slide over the internal core 35 as previously described without loss of fluid pressure. A retainer 56 holds the seal 52 in place. Plate 58 mates with internal plate 60 to provide threaded ports for the connection of hydraulic lines to ports 26 and 28 as previously described. An adjustable stop formed by a threaded stud 62 is threaded into [a] *an upstanding* portion *10a* of the [yoke 12] *base 10 as* best shown in FIG. 5 to be clamped by bolt 65 to *coact with a downwardly extending lug portion 56a of piston retainer 56 to* limit the travel of the piston means 24 relative to the yoke 12 during the return stroke; i.e., as the adjustable stop stud 62 is threaded into the [yoke] *base* to advance it to the right as shown in FIG. 4 the degree to which the work gap is opened by leftward movement of the piston means 24 and rightward movement of the distal end 18 of the yoke 12 is reduced to save time between consecutive mechanical operations.

As further shown in FIG. 4, a first compression spring 64 is shown connected between the end plate 38 of the yoke 12 and the base 10. Spring 64 is compressed toward the end of the return stroke; i.e., by movement of the yoke 12 to the right relative to the base 10 as seen in FIG. 4. This tends to store energy at the end of the return stroke so that as fluid pressure in line 46 is relieved the mechanical energy stored in the spring 64 immediately brings the distal portion 18 of the yoke into back up engagement with the workpiece 36 to prevent deformation as the piston or ram 24 is advance.

FIG. 4 further discloses a second spring 66 connected between the base 10 and the distal portion 18 of the yoke 12 to store energy by compression at the end of the work stroke; i.e., as the yoke is moved toward the left as shown in FIG. 4. When fluid pressure is relaxed at the end of the work stroke, this mechanical energy tends to immediately open or separate the yoke from the workpiece 36. It will be appreciated that springs 64 and 66 are typically employed in the alternative and specifically that spring 64 is placed in operation when the yoke 12 is in a horizontal or downwardly facing orientation whereas spring 66 is operative only with the distal end 18 of the yoke in an upward orientation and operating vertically. Spacer plates 78 and 80 are provided for establishing the preferred spacing of the punch die components.

Figure 6:
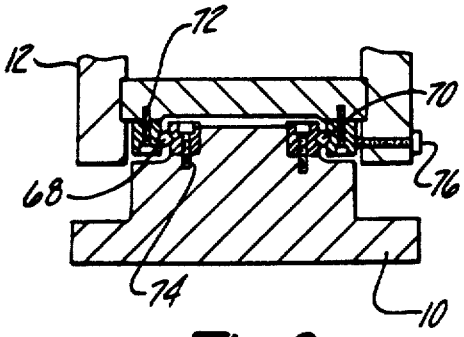
FIG. 6 is a sectional view along section line 6—6 of FIG. 4 showing the details of the linear roller bearings which support the yoke relative to the base.

Looking now to FIGS. 5 and 6, yoke 12 is preferably mounted on base 10 by means of linear roller bearings 68 and 70 in two parallel linear arrays. Machine screws 72 and 74 are provided for holding the bearing rollers in place and machine screw 76 through the side element of the yoke 12 is provided for adjusting bearing tightness. As well known to those skilled in the art, the linear roller bearings 68 and 70 comprise small cylindrical rollers which, in this case, are of equal axial length and diameter such that every other roller may be placed in the opposite bearing support orientation; i.e., the rollers are inserted with the roller axes at alternate 90 degree angular variations. The result is extremely smooth and friction free operation of the yoke relative to the base 10 with maximum efficiency in the mechanical operation for a given fluid pressure.

Overall, it can be seen that the internalization of the piston means 24 within the yoke 12 and particularly within the proximal portion 14 of the yoke which overlies the base 10 produces an apparatus or machine of extreme simplicity and compactness. The introduction of fluid pressure through the end plate 38 of the yoke 12 reduces the amount of travel which the fluid lines must experience during normal operation. The adjustable stop stud 62 is easily accessed from the outside of the device to establish the stroke length in a simple and expedient fashion. It is preferred that the yoke comprise separate top end and side plates so as to be susceptible of a bolt together construction which permits individual components to be easily repaired and replaced. The punch access slot 40 facilitates punch removal and replacement and the springs 64 and 66 permit the device to be readily operated in a variety of orientations.

Figure 7:
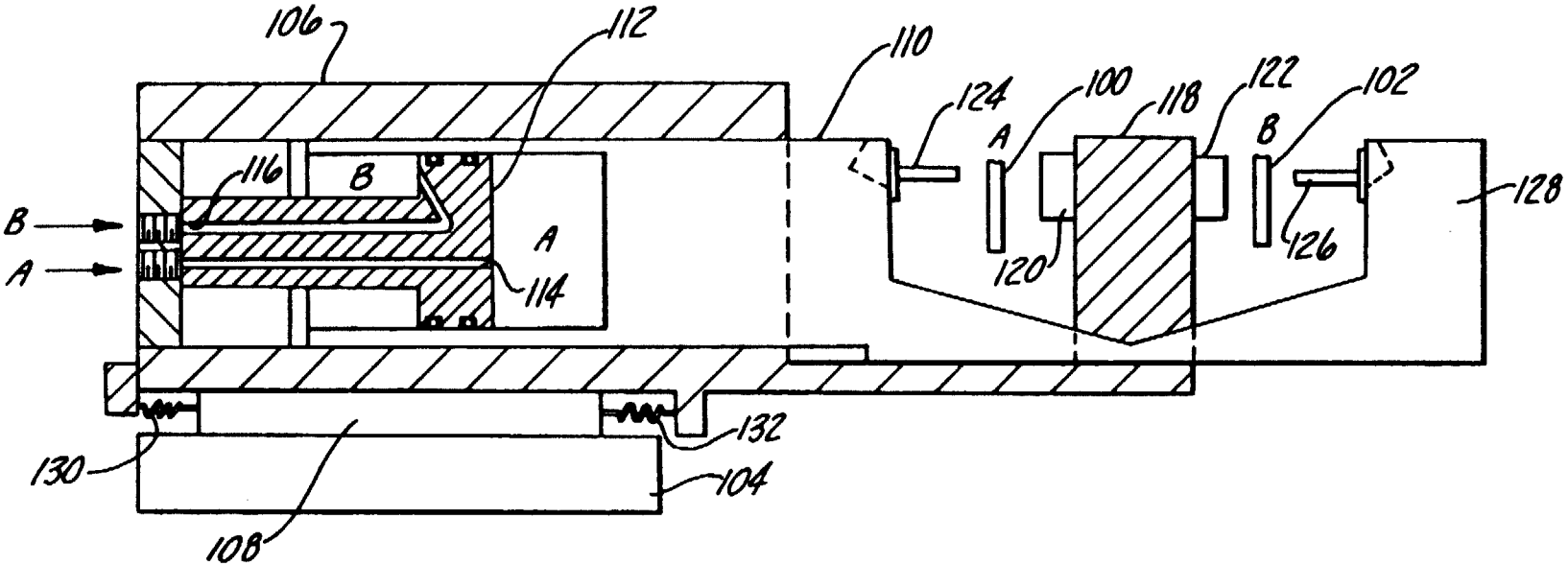
FIG. 7 is a partly-sectioned side view of a double-action device capable of piercing separate work pieces on both work and return strokes.

Referring now to FIG. 7, a second embodiment is disclosed which is capable of performing punching operations on workpieces 100 and 102 during work and return strokes, respectively. This device comprises a base 104, a yoke 106 mounted on base 104 by means of linear roller bearings 108, and a ram slideably mounted within the yoke. As in the previous embodiment, ram 110 slides over a core 112 having hydraulic passages 114 and 116 connected to ports "A" and "B" respectively. Application of fluid pressure to port "A" causes the ram 110 to move to the right and yoke 106 to move to the left as seen in FIG. 7 and this is termed the "work stroke" for consistency with prior explanation. Application of fluid pressure to port "B" causes the reciprocal action and this is termed the "return stroke".

Departing from the previous embodiment, yoke 106 comprises a distal end 118 carrying die buttons 120 and 122 on both the inside and outside faces. Ram 110 comprises a first punch 124 cooperating with button 120 and a second punch 126 on a leg 128 which is situated to the right of the distal yoke portion 118 as seen in FIG. 7. Accordingly, punching operations are carried out on both the work and return strokes of the ram 110, both of such operations being force-equalized as in the previous embodiment.

Although the operation of the device of FIG. 7 is believed to be apparent from the foregoing, a brief description is now made using the references "A" and "B" to designate the respective fluid pressures, pressure areas and work areas. Applying pressure to port "A" drives the ram 110 to the right and distal yoke portion 118 to the left to punch workpiece 100 in work area "A" while, at the same time, opening work area "B" to release and discharge workpiece 102. Applying pressure to port "B" and relieving port "A" causes ram 110 to move left and yoke portion 118 to move right opening work area "A" and closing area "B" to punch workpiece 102.

The multiple action concept of the device of FIG. 7 can be carried further to provide additional work areas by extending both yoke and ram. Additional ram power may be provided as necessary. In addition, the work areas shown to contain single punch die sets may be modified to carry two or more punch die sets as desired.

The device of FIG. 7 is also preferably provided with springs 130 and 132 which are alternatively operable to provide bias effects as described with reference to the first embodiment; i.e., when used with an "open center" valve, the spring force returns the yoke-ram combination to the centered position shown in FIG. 7. A cylinder may be used in place of springs 130,132 in a long-stroke device.

The device of FIG. 7 is preferably used to punch, pierce or form different portions of a single workpiece; for example, a U-shaped workpiece having depending legs defining elements 100 and 102. The double-acting device of FIG. 7 is inherently aligned and this solves what was heretofore a difficult problem of alignment using two separate rams. When the device of FIG. 7 is extended to perform four operations, this automatic alignment feature becomes even more advantageous.

I claim:

1. Apparatus for performing an operation such as piercing of a workpiece in an equalized forced mode so a to prevent distortion thereof comprising:

a base;

a yoke having a proximal portion mounted on the base for bidirectional movement along a work axis, and a distal portion for supporting one side of the workpiece during said operation;

integral piston and ram means slideably mounted within the proximal portion of the yoke for bidirectional movement relative to the yoke along the work axis to provide force on the other side of the workpiece during said operation;

means for supplying hydraulic fluid pressure to said integral piston and ram means to cause complemental movement of the piston means and yoke during work and return strokes;

said integral piston and ram means comprising a hollow cylindrical piston body defining first and second axially opposite fluid pressure reaction surfaces and having an exposed end which is proximate the distal end of the yoke and which defines with said distal end a work gap; and said apparatus further including an internal core mechanically fixed to the yoke, said piston body being arranged on the internal core for sliding movement thereover, said reaction surfaces and said core responding to fluid pressure to produce axial movement of said integral piston and ram means relative to said yoke when supplied with fluid pressure.

2. Apparatus as defined in claim 1 wherein said means for supplying hydraulic fluid pressure includes ports and passages formed in said internal core whereby fluid pressure acts internally of the integral piston and ram means.

3. Apparatus as defined in claim 1 wherein the work gap is located on one side of the distal portion of the yoke, the integral piston and ram means further comprising another work gap located on the other side of the distal portion of the yoke, whereby a first operation may be performed on a workpiece during the work stroke and a second operation may be performed on a workpiece during the return stroke.

4. A self-equalizing, pressure-producing apparatus for performing mechanical operations such as piercing and punching operations comprising:

a base;

a rigid yoke mounted on the base for sliding motion relative to the base along a work axis, said yoke comprising a distal portion for acting against one side of a workpiece during a mechanical operation and a proximal portion defining an integral piston slide chamber, the slide axis of which parallels the work axis;

a piston having a first part slideably mounted with the slide chamber and a second part integral with the first part extending toward the distal portion of the yoke for acting against the opposite side of the workpiece, said piston being substantially hollow to provide therewithin first and second opposite reaction surfaces;

core means fixed relative to the yoke and extending into the hollow piston for sliding motion relative thereto along an axis parallel to the work axis; and means for selectively applying fluid pressure through said core means to the hollow interior of said piston to apply pressure to the reaction surfaces in a selective manner to cause relative motion between the piston and yoke as desired.

5. Apparatus as defined in claim 4 further including means carried between the piston and the distal end of the yoke performing a mechanical operation on a workpiece as the piston moves toward the distal end.

6. Apparatus as defined in claim 5 wherein said means carried between the piston and the distal end is a punch.

* * * * *